J. DAIN.
HAY PRESS.
APPLICATION FILED FEB. 28, 1908.
1,045,125.
Patented Nov. 26, 1912.
2 SHEETS—SHEET 2.
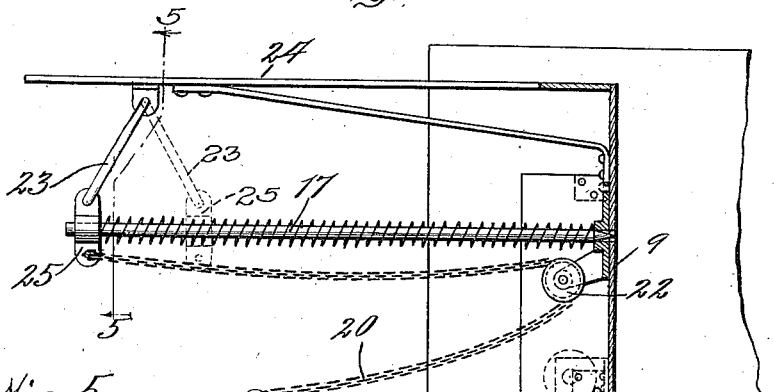
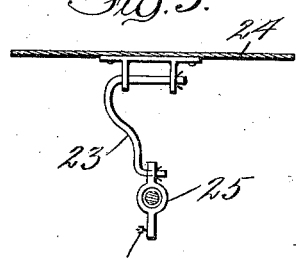
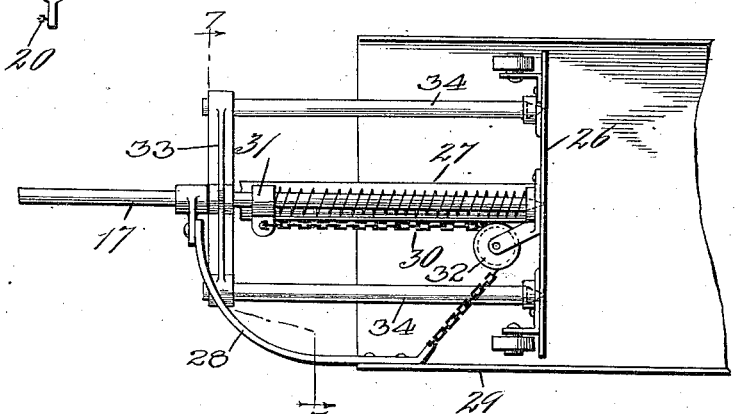
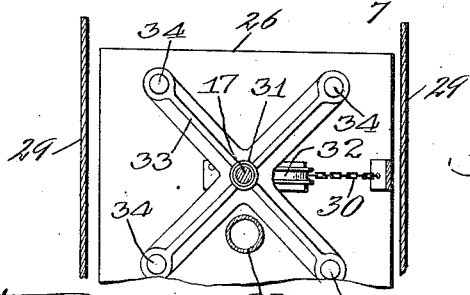
Witnesses:
Inventor:
Joseph Dain

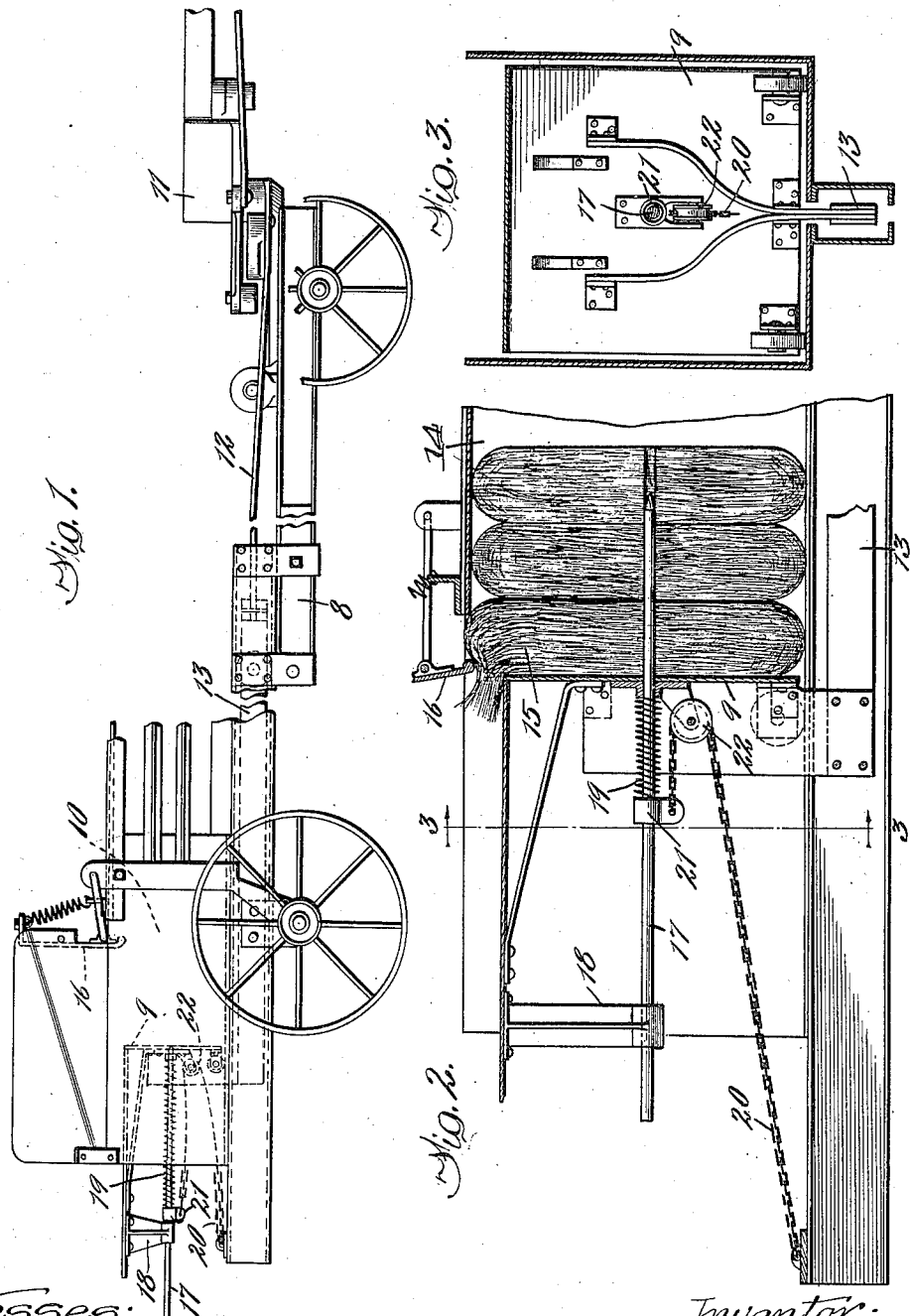

UNITED STATES PATENT OFFICE.

JOSEPH DAIN, OF OTTUMWA, IOWA.

HAY-PRESS.

1,045,125.  Specification of Letters Patent.  Patented Nov. 26, 1912.

Application filed February 28, 1908. Serial No. 418,399.

*To all whom it may concern:*

Be it known that I, JOSEPH DAIN, a citizen of the United States, residing at Ottumwa, in the county of Wapello and State of Iowa, have invented certain new and useful Improvements in Hay-Presses, of which the following is a specification, reference being had to the accompanying drawings.

My invention relates to hay presses, and has for its object to provide a new and improved hay-press by the use of which the bale formed will be provided with one or more holes extending longitudinally therethrough to permit a circulation of air within the bale. Usually the hay in the bottom of a stack is damp from contact with the ground, and as quite a large portion of the hay baled is taken from stacks it is very important to permit air to circulate to some extent through the bale in order to prevent the tendency of the baled hay to become damaged from heating or becoming moldy or musty.

In the embodiments of my invention illustrated in the accompanying drawings provision is made for forming one or more holes or passages through each charge of hay as it is compressed so that when the bale is finished the several holes will aline, forming a continuous hole or holes through the bale. Where a single hole is formed in the bale it is preferably at the center thereof and extends longitudinally from end to end of the bale. Where a plurality of holes are formed they extend longitudinally of the bale and are arranged in such positions as may be desired. The hole or holes are formed by means of a rod or needle which is arranged to reciprocate longitudinally of the bale and is normally retracted so as not to interfere with the placing of a charge in the feeding chamber of the press, but is projected after the plunger advances so as to extend through the fresh charge of hay as it enters the baling chamber and into the charge previously formed, reëntering the hole formed in such previous charge, and thereby preventing its being closed by the pressure of the hay being compressed. The result is that the hay is compressed around such rod or needle, and when the needle is withdrawn the passage through the compressed charge remains. The needle is withdrawn with the plunger upon the completion of the compressing operation.

In the drawings I have shown the application of my invention to a hay-press of the type shown and described in my Patent No. 857,604, dated June 25, 1907, but some features thereof may be applied to other forms of presses—either pull-power or push-power presses. The principal figures show it applied to a pull-power press, but I have also illustrated its application to a press operated by a push-power.

In the drawings,—Figure 1 is a partial side elevation of a pull-power press embodying my invention, showing the plunger-head advanced to take up the slack in the chain; Fig. 2 is an enlarged detail, being a partial longitudinal section of the baling chamber and plunger with the parts carried by them; Fig. 3 is a cross-section on line 3—3 of Fig. 2; Fig. 4 is a view showing a modification; Fig. 5 is a section on line 5—5 of Fig. 4; Fig. 6 is a partial plan view, illustrating the application of my invention to a push-power press, showing a plurality of rods or needles; and Fig. 7 is a partial section on line 7—7 of Fig. 6.

Referring to the drawings,—8 indicates the frame of the machine, which is of any suitable type.

9 indicates the plunger-head, which is reciprocated in the baling chamber 10 by means of a horse-power mechanism 11 operating through a connecting-rod 12 and slide-bar 13, as described in my patent above referred to. 14—15 indicate compressed charges of hay. 16 indicates a tucking device, also described in my said patent.

17 indicates the perforator, in the form of a needle or rod, which forms the hole or perforation through the charges of hay. Said needle is mounted horizontally on the plunger, one end being supported by a bracket 18 and the other end being fitted in a suitable bearing in the plunger-head, as shown in Fig. 2. A spring 19 on the needle serves to retract it when the plunger rebounds. The needle is caused to advance when the plunger advances by means of a chain 20 connected at one end with the frame of the machine and at the other end to a collar 21 mounted on the needle 17 and secured thereto, as best shown in Fig. 2. The chain 20 passes around a pulley 22 suitably supported by the plunger-head, as also shown in Fig. 2. The forward end of the needle or rod 17 is pointed so that it will penetrate the hay more readily. In operation, when the plunger advances, the slack in the chain 20 is taken up and operates to project the needle or rod 17 forward, i. e. toward the charge of hay to be compressed, which it penetrates, as shown in Fig. 2, remaining in such position until the compressing operation is completed and the plunger rebounds. The spring 19 serves to retract the needle to the position shown in Fig. 1 when it is wholly withdrawn and does not project beyond the face of the plunger.

In Fig. 4 I have illustrated a modified arrangement, in which instead of employing a fixed bracket 18, I provide a hanger 23 suspended from the top-plate 24 to the plunger and connected with a collar 25 which is secured to the rear end of the rod or needle 17. The chain 20 is connected with the collar 25 so that said collar serves also the purpose of the collar 21 shown in Fig. 2.

In Figs. 6 and 7 I have illustrated the application of the invention to a push-power press and an arrangement by which a plurality of holes may be made. The construction is substantially the same as in the earlier figures, so far as the operation of the rod or needle 17 is concerned, but a plurality of rods or needles are used. In the latter construction 26 indicates the plunger-head, 27 the plunger-rod or pitman by which it is operated, 28 a bracket which is connected at one side of the baling case 29, and forms a guide for the rod or needle 17. 33 indicates a bracket for supporting a plurality of rods or needles. 30 indicates the operating chain for the needle 17 which is connected with a collar 31 similar to the collar 21. The chain 30 is also connected with one side of the baling case running around a pulley 32 supported by the plunger-head. The operation is substantially the same as that already described. The arrangement shown, in which a plurality of needles are employed, may be applied to a pull-power press as well as to the form shown.

That which I claim as my invention, and desire to secure by Letters Patent, is,—

1. A hay-press, comprising a baling chamber, a plunger at one side of said baling chamber, mechanism at the other side of said baling chamber for moving said plunger thereinto, and means adapted to be projected through the plunger and actuated by the movement of the plunger, to be projected therethrough for forming a perforation or passage in the bale.

2. A hay-press, comprising a baling chamber, a plunger at one side of said baling chamber, mechanism at the other side of said baling chamber for moving said plunger thereinto, and means carried by and adapted to be projected through the plunger and actuated by the movement of the plunger, to be projected therethrough for forming a perforation or passage in the bale.

3. A hay-press having a plunger, pull-power mechanism for actuating said plunger, means carried by the plunger and adapted to be projected therethrough for perforating the hay compressed by the plunger, and means operated by the movement of the plunger for actuating said perforating means.

4. A hay-press having a plunger, mechanism for actuating said plunger, means carried by the plunger and adapted to be projected therethrough for perforating the hay compressed by the plunger, and means operated by the movement of the plunger for actuating said perforating means.

5. A hay-press having a baling chamber, a plunger for compressing the hay, pull-power mechanism for actuating said plunger, a perforator normally withdrawn from the baling chamber, means operated by the actuation of said pull-power mechanism for operating said perforator to cause it to project through the plunger and perforate the charge of hay as the plunger is advanced to compress the same, and a spring for retracting said perforator.

6. A hay-press having a baling chamber, a plunger for compressing the hay, pull-power mechanism for actuating said plunger, a perforator carried by the plunger and normally withdrawn from the baling chamber, and means operated by the movement of the plunger for operating said perforator to cause it to project through the plunger and perforate the charge of hay as the plunger is advanced to compress the same.

7. A hay-press having a baling chamber, a plunger for compressing the hay, pull-power mechanism for actuating said plunger, a perforator carried by the plunger and normally withdrawn from the baling chamber, means operated by the actuation of said pull-power mechanism for operating said perforator to cause it to project through the plunger and perforate the charge of hay as the plunger is advanced to compress the same, and a spring for retracting said perforator.

8. A hay-press having a baling chamber, a plunger, pull-power mechanism for operating said plunger to compress the hay, a perforator carried by the plunger, a flexible connection connected with said perforator and with the frame of the machine, a pulley carried by the plunger around which said flexible connection passes, and means for retracting the plunger.

9. A hay-press having a baling chamber, a plunger, a perforator carried by the plunger, a spring for normally retracting said perforator, and means actuated by the operation of the plunger to compress a charge for projecting said perforator to perforate the charge.

10. A hay-press having a baling chamber, a plunger, a perforator carried by the plunger, a spring for normally retracting said perforator, a flexible connection connected with said perforator and the frame of the machine, and a pulley carried by the plunger around which said flexible connection passes.

11. A hay-press having a baling chamber, a plunger for compressing the hay, mechanism for actuating the plunger, a perforator adapted to be projected through the plunger for perforating the charge of hay, and means actuated by movement of the plunger into the baling chamber for causing the perforator to project therethrough into the charge of hay.

12. A hay-press having a baling chamber, a plunger for compressing the hay, mechanism for moving said plunger into the baling chamber, a perforator adapted to be projected through the plunger into the charge of hay for perforating the same, said perforator being movable at a different rate of speed than the plunger, and means for actuating the perforator to cause it to project into the charge of hay as the plunger advances into the baling chamber.

13. A hay-press having a baling chamber, a plunger for compressing the hay, mechanism for actuating the plunger, a perforator carried by the plunger and adapted to be projected therethrough for perforating the charge of hay, and means actuated by movement of the plunger into the baling chamber for causing the perforator to project therethrough into the charge of hay.

14. A hay-press having a baling chamber, a plunger for compressing the hay, mechanism for moving said plunger into the baling chamber, a perforator carried by the plunger and adapted to be projected therethrough into the charge of hay for perforating the same, said perforator being movable at a different rate of speed than the plunger, and means for actuating the perforator to cause it to project into the charge of hay as the plunger advances into the baling chamber.

15. A hay-press having a baling-chamber, a plunger for compressing the hay, mechanism for actuating the plunger, a perforator normally lying back of the operative face of the plunger and adapted to be projected therethrough to perforate the charge of hay, and means for causing the perforator to move through the plunger head into the baling chamber as the plunger advances thereinto.

16. A hay-press having a baling chamber, a plunger for compressing the hay, mechanism for actuating the plunger, a perforator normally lying back of the operative face of the plunger and adapted to be projected therethrough to perforate the charge of hay, and means actuated by movement of the plunger for causing the perforator to move through the plunger head into the baling chamber as the plunger advances thereinto.

JOSEPH DAIN.

Witnesses:
W. G. DUFFIELD,
C. A. LASSER.

Copies of this patent may be obtained for five cents each, by addressing the "Commissioner of Patents, Washington, D. C."